United States Patent [19]
Tyler

[11] 3,961,237
[45] June 1, 1976

[54] MODULATING ELECTRONIC ROOM THERMOSTAT

[75] Inventor: Hugh Jean Tyler, Santa Ana, Calif.

[73] Assignee: Robertshaw Controls Company, Richmond, Va.

[22] Filed: Nov. 11, 1974

[21] Appl. No.: 522,326

[52] U.S. Cl. .................................. 323/19; 323/25; 323/68; 323/69
[51] Int. Cl.[2] ................................. G05D 23/24
[58] Field of Search .......... 73/339, 340, 342, 362 R, 73/362 AR; 307/310; 323/16, 19, 22 T, 23, 25, 68, 69; 338/22 R, 31, 123, 149, 176, 182, 227

[56] References Cited
UNITED STATES PATENTS

| | | | |
|---|---|---|---|
| 2,917,288 | 12/1959 | Sims et al. | 323/69 X |
| 3,052,124 | 9/1962 | Averitt | 73/362 AR |
| 3,166,246 | 1/1965 | Fielden | 323/69 X |
| 3,222,882 | 12/1965 | Sutton et al. | 307/310 |
| 3,305,176 | 2/1967 | Brace | 307/310 X |
| 3,597,676 | 8/1971 | Moore | 323/68 X |

OTHER PUBLICATIONS

Davis, "Temperature Control System Based on Thermistor Bridge," Control & Instrumentation, Apr. 1971, vol. 3, No. 4, pp. 35, 37.

*Primary Examiner*—A. D. Pellinen
*Attorney, Agent, or Firm*—Fulwider, Patton, Rieber, Lee & Utecht

[57] ABSTRACT

A thermostatic device for generation of a plurality of direct current analog signals responsive to temperature deviation of a control zone from a plurality of set temperature points. The device has a plurality of direct current voltage signal generators, each of which includes a thermistor with a negative temperature coefficient in circuit with a variable resistor and an adjustment mechanism associated therewith whereby the value of the resistor can be fixedly adjusted to provide a limited degree of adjustability of the set temperature points. The adjustment mechanism includes fixed stops whereby the lowermost set temperature point can not be raised and the uppermost set temperature point can not be lowered. In a typical embodiment, the thermostat comprises two thermostatic devices, one set at a lower set temperature point of about 68°F. maximum with an adjustment mechanism permitting adjustability to a lower set point temperature, e.g., to as low as 55°F. The second thermostatic device is set at a higher set temperature point, such as 78°F. minimum, with an adjustment mechanism permitting resetting of this temperature to a higher value, e.g., to 85°F. The thermostat is used in combination with a signal conditioning circuit which comprises an operational amplifier in a comparator circuit having a reference leg and the thermostat leg supplied with a special regulated direct current power supply. This circuit includes a protective solid state switch to prevent accidental destruction of the circuit components in the event that the circuit is inadvertently grounded during installation or repair.

20 Claims, 4 Drawing Figures

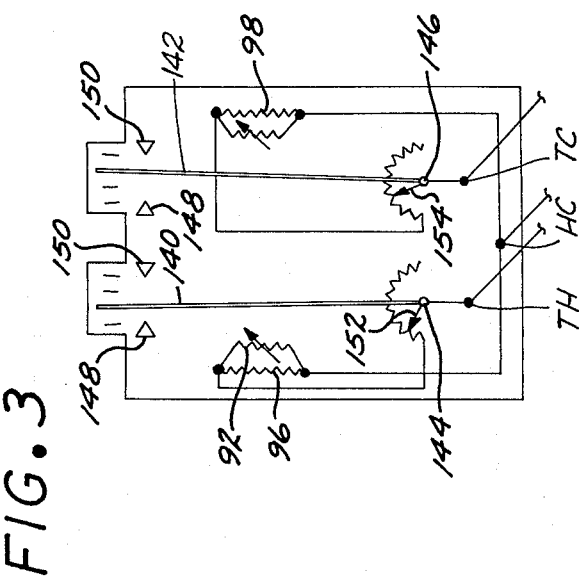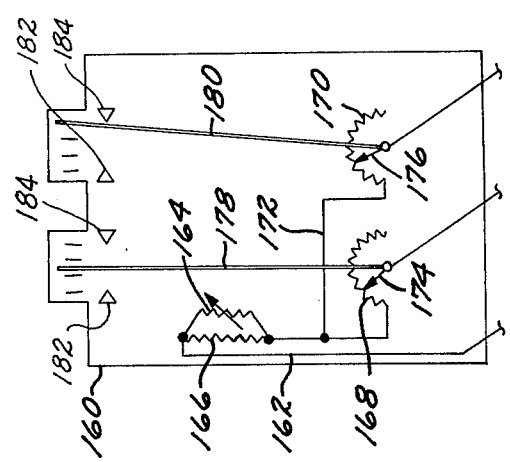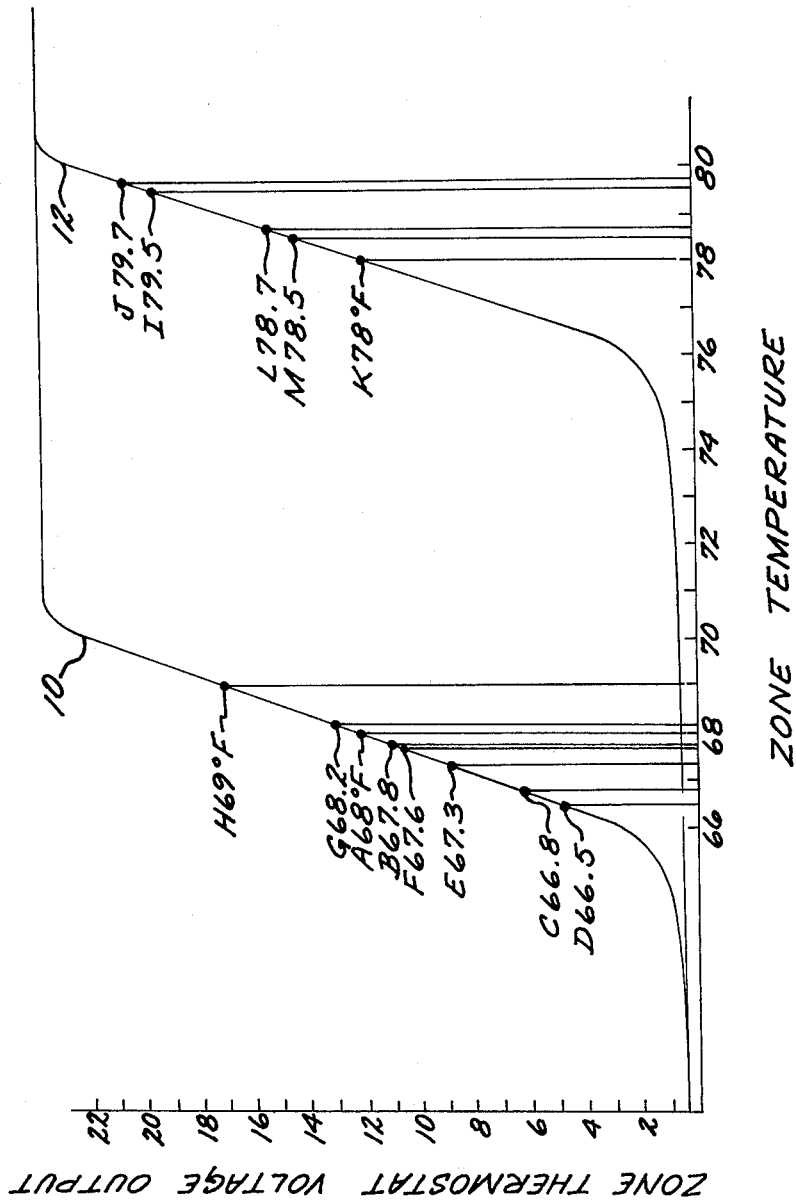

MODULATING ELECTRONIC ROOM THERMOSTAT

CROSS REFERENCE TO RELATED APPLICATIONS

The output signals from the signal conditioning circuit are applied through the various circuits of an air conditioning system such as that disclosed in my copending application, Ser. No. 502,049, filed Aug. 30, 1974.

BACKGROUND OF THE INVENTION

Field of the Invention:

This invention relates to a temperature sensing means such as a thermostat useful for generating analog voltage error signals about a plurality of set temperature points and for developing conditioned command signals therefrom which are useful in control circuits of an air conditioning system.

Brief Statement of the Prior Art:

Air conditioning systems for providing one or more zones of controlled air temperatures within a building have commonly employed a single thermostat in each of the controlled zones of the building. These thermostats are operative to activate heating or cooling means of the air conditioning system in response to the deviation of the control zone temperature below or above a single, set temperature point. The thermostats have included circuits for developing analog DC voltage command signals by the employment of thermistors with negative temperature coefficients in the manner described in U.S. Pat. No. 3,702,431.

The increasing concern with energy consumption in the air conditioning of buildings has lead to the suggestion that the cooling facilities be controlled by a high set temperature point, typically about 78° F. and the heating facilities be controlled at a lower set temperature point, typically about 68° F. The application of existing thermostats to such systems does not provide adequate control over the fixed adjustability of the set temperature points.

A number of fairly complex, solid state circuits have been devised for developing a command signal from a thermostat such as described in the aforementioned patent. A common failing of these devices is the absence of any protective circuit means whereby the delicate circuit components can be protected in the event that the output terminals of the circuit are inadvertently grounded across its voltage supply.

BRIEF STATEMENT OF THE INVENTION

This invention comprises a temperature sensing means that has a plurality of circuit means for generating analog, command signals about a plurality of set temperature points, preferably an upper and a lower set temperature point, with adjustment means whereby the value of the set point temperatures can be fixedly adjusted with adjustment stop means for preventing the raising of the lower set point temperature above a predetermined value and for preventing the lowering of the upper set temperature point below a predetermined value. The preferred embodiment of the invention comprises first and second electrical circuit means to generate a plurality of analog, direct current command signals about the lower and upper set temperature points. The invention also includes command signal conditioning circuit means for receiving the analog voltage command signals from the temperature sensing means, comparing such signals to predetermined reference signals and generating net command signals therefrom that have a magnitude responsive to the deviation of the sensed temperature from the set temperature points. The circuit means employs operational amplifier means in a comparator circuit having a reference circuit leg which includes a regulated current source. The command signal input circuit to the operational amplifier comprises the other leg of the comparator circuit and is also connected to the regulated current source and includes the thermistor and variable resistance means of the temperature sensing means. Two such operational amplifiers and comparator circuit means are provided; each is associated with one of the voltage command signal generating means of the thermostat whereby error signals about each of the set temperature points can be generated. The circuit means employed in the invention also include protective circuit means to prevent damage to the components of the signal conditioning circuit means in the event that the output terminals thereof are grounded across the voltage supply during installation or repair of the system.

BRIEF DESCRIPTION OF THE DRAWINGS

The invention will be described by the illustration of the presently preferred embodiments which are shown by:

FIG. 1 which illustrates the conditioned command signal outputs of the signal conditioning circuit in response to the sensed zone temperatures;

FIG. 3 which illustrates a temperature sensing means according to the invention; and FIG. 4 which illustrates single sensor temperature sensing means.

DESCRIPTION OF PREFERRED EMBODIMENTS

Figure 2:
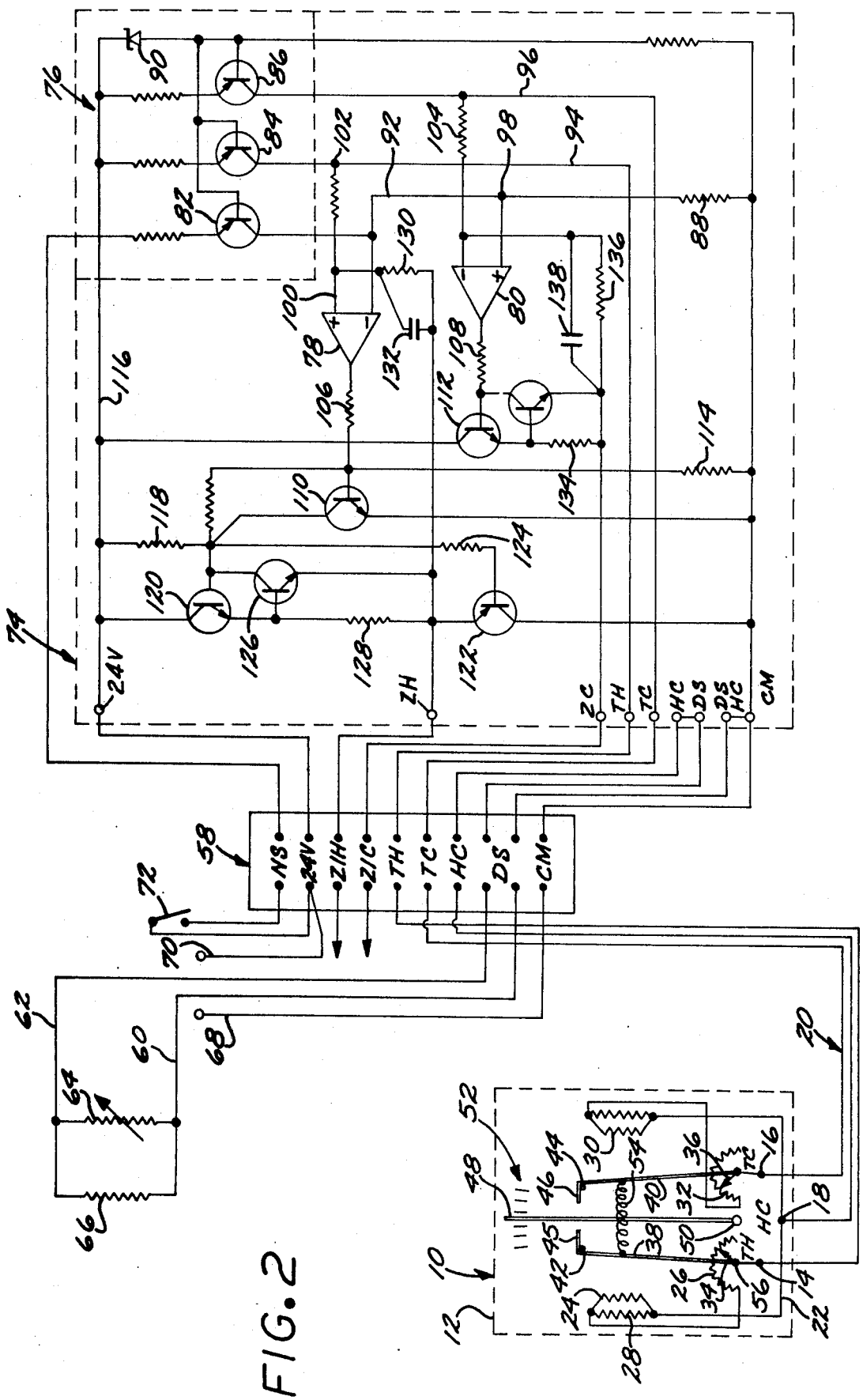
FIG. 2 which is a schematic diagram of the circuit means of the invention.

Referring now to FIG. 1, there is a graphic depiction of the output signals developed by the temperature sensing means of the invention. The invention is illustrated with reference to a specific embodiment having specific values of control set temperature points and conditioned command voltage signals. This is intended to illustrate the most preferred embodiment only and is not intended to be limiting of the invention. As apparent to those skilled in the art, the system described herein can be widely adopted to various control zones set point temperatures and control signal voltages. As illustrated in FIG. 1, the control system has two set air temperature points. These are 68° and 78° F. which are illustrated by the points A and K, respectively. The set temperature point A can be used for the control of the heating and ventilation facilities of an air conditioning system, while set temperature point K can be employed for the control of air cooling facilities of such an air conditioning system.

FIG. 1 illustrates the thermostat circuit output voltages as a function of control zone temperatures and is typical of any or all of the controlled zone temperature sensing means employed in individual controlled zones of the system. The air conditioning system which can be operated in response to the voltage signals generated by the thermostat and circuit means of this invention can comprise a typical air conditioning system which includes air heating, air cooling and air circulation facilities to direct conditioned air to one or more zones of controlled air temperature and to return air therefrom for recirculation. The air conditioning system typically includes ventilation damper and exhaust damper facilities whereby the relative proportions of fresh and returned air circulated through the control zones can be adjusted in a controlled manner.

Referring to FIG. 1, line 10 is seen to pass through the set temperature point A and illustrates the output signals developed by the thermostat and circuit means of the invention in response to variation in sensed zone temperatures. As the air temperature in the control zone decreases from the set temperature point, the output signal from the signal conditioning circuit progressively decreases in a linear fashion along line 10. In a typical embodiment, the slope of line 10 corresponds to approximately a five volt change in error signal with each degree of change in the sensed zone temperature.

The voltage signals obtained from the signal conditioning circuit can be employed for a plurality of control operation of the air conditioning system. Thus, as the voltage signal decreases, the damper motor will gradually close the damper of the cooling air duct and open the damper in the heating supply duct to the control zone, until, at 11 volts and 67.8° F., the damper to the cooling duct is fully closed and that to the heating zone is fully open. As the sensed temperature drops to point C at 66.8° F., a voltage signal of about 6 volts is obtained which is sufficient to activate the first stage of heating means of the air conditioning system. Should the sensed temperature continue to drop, a second stage of heating can be activated at point D, 66.5° F. at about 4.5 volts. The air conditioning system can employ a large number or plurality of heating stages and, when many stages are employed, they are preferably activated in a staged manner with each increment of approximately 2.5 volts decrease in conditioned command signal, corresponding to approximately 0.5 degree F. incremental decrease in the sensed temperature.

As the temperature in the controlled zone responds to the input of heating, the temperature rises and approaches the set temperature point. As the temperature reaches point E, which can be at 67.3° F., the voltage signal of about 8.5 volts can be applied to deactivate the second stage of heating. Similarly, the first stage of heating can be deactivated when the conditioned error signal rises to about 10 volts, corresponding to 67.6° F. sensed temperature.

When the sensed air temperature in the controlled zone passes point B on line 10, a command signal of about 11 volts, corresponding to 67.8° F., is effective to progressively open the damper of the cooling supply duct and close the damper of the heating supply duct to the control zone. The ventilation and exhaust dampers which control the introduction of outside air into the system and discharge the return air from the system remain at their minimal open position, e.g., that permitting introduction of about 5 to 20 volume percent of fresh air based on total air circulated. In the event that the sensed temperature of the control zone should rise above point G, 68.2° F., and an outut signal of 13 volts be thereby generated, this command signal is effective to generate a control signal that is applied to the ventilation motor controller to open the ventilation dampers in the fresh air inlet and exhaust damper in the return air duct and close the return air damper in the return air duct in a proportional manner, responding to the magnitude of the command signal. The ventilation motor controller of the air conditioning system also receives a control signal that is proportional to outside air temperature so that the ventilation and exhaust dampers will not open unless the outside air temperature is low enough to provide effective cooling, for example, below the set temperature point of 68° F.

If the temperature in the control zone continues to rise and, if the outside air temperature is below the set temperature point A, the ventilation damper will progressively open until, at point H, 69° F. and 17 volts, the ventilation air damper is fully opened and the return air damper is fully closed so that the air conditioning system is supplied with outside air only.

The air temperature in the control zone is permitted to drift through a region from the temperature represented at point H, 69° F., to point I, 79.5° F. on cooling curve 12. The cooling curve 12 represents the command voltage signal generated by the second thermostat of the invention. The slope of line 12 is approximately 5 volts per degree of temperature change. If the sensed temperature in the control zone rises to 79.5° F., the circuit means generates a command signal of 19.5 volts which is sufficient when applied to the controlled circuit of the air conditioning system to activate the first stage of air cooling facilities. This signal is also sufficient to actuate the ventilation damper motor controller, close the ventilation and exhaust dampers and open the return air damper so that the return air rather than the warm outside air is cooled. If the temperature continues to rise in the control zone, successive stages of mechanical cooling can be progressively activated with each 1 volt incremental increase in output signal, corresponding to an increase of about 0.2 F. of sensed temperature. This is illustrated at point J where an error signal of 20.5 volts is generated at 79.7 ° F. sensed temperature.

As the temperature decreases in the controlled zone, the air cooling facilities can be progressively deactivated by generation of error signals of 15.5 volts at point L corresponding to 78.7° F. which deactivates the second stage of cooling and by generation of an error signal of 14.5 volts at 78.5° F., point M, that deactivates the first stage of cooling facilities.

Each control zone in the building serviced by the air conditioning system is provided with a temperature sensing means 10 which has a plurality of circuit means, each at different set point temperatures, for generating a plurality of DC analog voltage signals therefrom. As shown in FIG. 2, the temperature sensing means 10 includes a housing 12 within which are mounted the plurality of circuit means. Housing 12 is provided with three terminal posts 14, 16, and 18. A single, three-lead conductor 20 has one of its leads connected to each of the terminal posts which are identified as TH, HC and TC on the housing. The circuit means within the housing comprises a first circuit having a lead 22 extending from the common terminal 18 thermistor 24 which is in series with the windings 26 of a potentiometer.

Thermistor 24 is a conventional thermistor having a negative temperature coefficient. The thermistor 24 is in parallel with a high value resistor 28. The high resistance value of resistor 28 in parallel with the thermistor reduces the nonlinearity of the thermistor to provide a substantially linear response to temperature changes. The other circuit of the temperature sensing means 10 is substantially identical and has thermistor 30 in series with the windings 32 of a second potentiometer. The wiper contacts of the potentiometers are connected to their respective terminal posts in the housing 12, i.e., to terminal posts TH and to terminal post TC.

The wiper arms 34 and 36 of the potentiometers are mechanically linked to lever arms 38 and 40, respectively. These lever arms are pivoted at the wiper arm pivot point of the potentiometers and are restrained in their pivotal movement by stops 42 and 44 which project from an interior wall of housing 12. Each of arms 38 and 40 have a short inboard projection 45 and 46 and the ends of these projections are separated by a gap through which the thermostat adjustment lever 48 extends. Lever 48 is pivotally mounted in housing 12 by frictional pivot pin 50 and projects beside scale 52 which bears indicia which are calibrated in a temperature scale. The individual lever arms 38 and 40 are biased against their respective stops 42 and 44 by suitable spring means such as tension spring 54. The pivot end of each of these arms is mechanically linked to its respective wiper arm 38 and 40 of the potentiometer by adjustment means such as screw 56 whereby the angular relationship between the lever arm and its associated potentiometer wiper arm can be fixedly adjusted. The temperature sensing means 10 is thereby provided with two independent circuit means with internal adjustment means for variation of the circuit resistance which is useful to calibrate the circuit to a preselected resistance for a particular set point temperature and for a limited degree of external adjustment by lever 48 to levels below or above the preselected set point temperatures with a band of 3° to about 15°, preferably about 10° F., between those set point temperatures. In the embodiment described herein, the circuit means connected between terminals HC and TH generates a heating and ventilation control signal about a set temperature point of 68° F. with means permitting adjustability to a lower set temperature point, e.g., to as low as 55° F. Typically, a range could be from 55° to 70°F. Similarly, the sensing means 10 contains a second circuit between terminals HC and TC which is calibrated about a second, higher set temperature point such as 78° F. with means permitting adjustability to a higher set temperature point, e.g., to 85° F. Typically, a range could be from 73° to 85° F. The fixed adjustability of these circuits by the internal variation between the angular orientation of arms 38 and 40 and their respective potentiometer wiper arms 34 and 36 provides a facile means for factory adjustment of the low and high set point temperatures.

The terminals of zone temperature sensing means 10 are connected by multiple conductor 20 to the corresponding terminal posts identified as TH, TC and HC on a connector panel 58. Connector panel 58 can have a plurality of other input terminals to receive leads 60 and 62 which extend to another thermistor 64 and its associated parallel resistor 66. Thermistor 64 can be located in the duct to the controlled zone, downstream of the dampers which communicate with hot and cold decks. Preferably, this thermistor is in the roof top unit in the common duct connected to the feeder ducts and is responsive to the temperature of the conditioned air supplied to its controlled zone. The connector panel 58 is also supplied with a source of 24 volts D.C. regulated voltage supply through leads 68 and 70 which are connected, respectively, through the terminal posts identified as 24 V and CM on terminal connector panel 58. A switch 72 is provided between terminal posts 24 V and NS on the connector panel. This switch means 72 can be a manually actuated or, preferably, a timer controlled switch to open the controlled zones' dampers to the hot deck. Associated with this is relay means (not shown) to switch out the control system, close the fresh air and exhaust dampers, and to connect the heater controls of the air conditioning system to an independent control set at a low night time temperature.

Circuit means are provided for conditioning the signals generated by the zone temperature sensing means to produce D.C. analog signals therefrom having a magnitude proportional to the sensed temperature. The signal conditioning circuit means is shown as circuit 74 which, preferably, is a modular unit on a circuit board adapted for plug-in connection to the terminals on terminal connector panel 58.

Signal conditioning circuit means 74 includes a regulated or constant current supply circuit 76 and a pair of operational amplifiers 78 and 80 for comparing the D.C. voltage signals from temperature sensing means 10 to a reference signal and generating output signals therefrom at terminals ZIH and ZIC which have a magnitude proportional to the sensed temperatures in unit 10.

The zone temperature sensing means 10 and the circuits contained therein are portions of a comparator circuit which provides input signals to amplifiers in the signal conditioning circuit contained in circuit 74. The conditioning circuit means includes a current regulated supply circuit 76 having a plurality of transistors 82 and 84 and 86 which have their emitter and collector terminals connected in series with the sensor network of unit 10 and the reference resistor 88 and their bases biased with a constant voltage source which is the breakdown voltage of Zener diode 90, thereby insuring a relatively constant current supply through each of the legs. These legs are reference leg 92, first input signal leg 94 and second input signal leg 96. The first input signal leg 94 extends to the TH terminal of the circuit board through the three lead conductor 20 (FIG. 2) to the TH terminal of the zone temperature sensing means 10. The leg extends through the heating and ventilation signal generating circuit of the sensing means 10, including winding 26 of the variable potentiometer and thermistor 24, returning to the HC and DS terminals of the circuit board panel 58. The leg then extends through the duct temperature circuit means including thermistor 64 and returns to the other DS terminal of the connector panel. The leg also extends through the DS terminal to the common or ground terminal of the circuit means 74.

The reference signal leg 92 of the comparator circuit includes a resistance 88 of a fixed value to provide a voltage drop that will provide the desired reference voltage at point 98. This reference voltage developed at point 98 is applied to the minus terminal of operational amplifier 78 and the plus terminal of operational amplifier 80 as the reference signal thereto. Connector 100 is extended from the input positive terminal of amplifier 78 to connection with leg 94 at point 102 to provide an input signal to operational amplifier 78. Similarly, connector 104 extends to a connection with the leg 96 for application of an input signal to the negative terminal of amplifier 80. The output signal from amplifiers 78 and 80 are applied through load resistors 106 and 108 to the base connections of transistors 110 and 112. Resistor 114 is located between the base of transistor 110 and the common terminal of the voltage supply. The current supply to the collector of transistor 110 is from the 24 V D C buss 116 through resistor 118. The base of transistor 120 is connected to the collector terminal of transistor 110 so that the collector voltage of transistor 110 is applied to the base of transistor 120. A transistor 122 of opposite polarity, PNP type, is located between the ZH and common terminals with its base connected to the collector terminal of transistor 110 through resistor 124 thereby providing for an output signal between terminals ZH and the common terminal over a wide range of voltages in response to the output of amplifier 78. Transistor 126 is provided with its collector connected to the base of transistor 120 and its emitter connected to the ZH terminal. This transistor is biased to a saturated condition by the application of a small potential, e.g., about two volts across the resistor 128, in series with transistor 120. The resistor 128 has a value such that a safe current through it, and transistor 120, will produce 2 volts and saturate transistor 120 and thereby serve as a protective switch to avoid destruction of the transistor 120 in the event that the ZH terminal is inadvertently grounded during installation of the circuit.

Operation amplifier 78 is provided with a feedback to the signal input connector 100 by resistor 130 which is in parallel with capacitor 132. The value of resistor 130 is selected so as to achieve the desired gain in amplifier 78 while capacitor 132 serves to eliminate any voltage spikes from the feedback signal in accordance with customary techniques.

The input signal from the TC terminal and the leg 96 of the comparator circuit which includes thermistor 30 and potentiometer 32 of temperature sensing unit 10, which is the circuit means that is adjusted to the higher set point temperature, is applied to the negative input terminal of operational amplifier 80. The output from this amplifier is passed through load resistor 108 to the base of transistor 112. The emitter of transistor 112 is connected to the output terminal ZC through current limiting circuit resistor 134. Feedback to amplifier 80 is through resistor 136 in parallel with capacitor 138.

When the temperature in the control zone departs from the set temperature point, the resistance value of thermistors 28 and 30 are changed from their initial values, decreasing with increasing temperatures. With an increase in sensed temperature, the value of thermistor 28 decreases and the current is maintained constant by regulator circuit means 76, lowering the voltage at point 102. This changes the input to amplifier 78 which supplies an amplified lower output to the base of transistor 110 that raises the voltage to the base of transistor 120 and supplies an amplified output signal to terminal ZH above the 12 volt, nominal output condition. Similarly a decrease in the sensed temperature results in an increase in resistance of thermistor 28 and a higher voltage at point 102 generating a higher output from amplifier 78 which, through transistor 110 and transistor 120, results in a lower amplified output at terminal ZH.

The relative values of the components of the temperature sensing and signal conditioning circuits are chosen to provide a high sensitivity in the circuit. The thermistors 28 and 30 are preset to greater sensitivity to temperature changes than duct sensing thermistor 64 by proper selection of the parallel resistance values connected across these thermistors. Typically, the thermistors 28 and 30 with proper parallel resistors connected across their terminals provide a negative temperature coefficient of about 50–150 ohms per degree Fahrenheit while that of thermistor 64 is from about 1 to about 10 ohms per degree Fahrenheit. The temperature sensing circuits produce output voltages which range from about 2 to about 22 volts D.C. when using a 24 volt D.C. supply.

FIG. 3 illustrates an alternative temperature sensing means, that can be employed in the invention. In this embodiment, separate control levers 140 and 142 are provided whereby the upper and lower set point temperatures, respectively, can be adjusted. As shown, the levers 140 and 142 are pivotal about pins 144 and 146, respectively. The levers have a limited degree of pivotal adjustment between fixed abutments or stops 148 and 150 that are disposed to either side of the levers. The levers are interconnected to their respective potentiometer wiper arms 152 and 154 by suitable adjustment screw means whereby the angular relationship between the wiper arms and levers can be fixedly adjusted in a factory calibration. Typically, the fixed adjustment of these mechanical parts would be set such that the lever 142, which controls the cooling facilities of the air conditioning system, could not be moved below an upper set temperature point, e.g., about 78° F., while the lever 140, which controls the heating and ventilation facilities of the air conditioning system, could not be moved above the lower set temperature point of about 68° F.

The invention has been described with reference to temperature sensing means having separate circuits with independent temperature responsive elements, i.e., thermistors 24 and 30 of FIG. 2 and thermistors 92 and 98 of FIG. 3. A single temperature responsive element can be employed, if desired, for an economy in components. FIG. 4 illustrates a temperature sensing device having a single thermistor. This device is similar in construction to those of FIGS. 2 and 3, having a housing 160 that contains the plurality of temperature sensing circuit means. The housing has three terminal posts HC, TH and TC which can be connected to a single three-lead conductor, as described in regard to FIG. 2. The first circuit in housing 160 comprises a lead 162 extending from the common terminal HC to thermistor 164, which is in parallel to a high value resistor 166, and a lead from thermistor 164 to the terminal of potentiometer 168. Terminal TH is connected to the wiper arm terminal of potentiometer 168. The second circuit means in housing 160 also includes lead 162, thermistor 164 and resistor 166. The terminal of thermistor 164, however, is connected to the winding terminal of potentiometer 170 by lead 172. The TC terminal of housing 160 is connected to the wiper terminal of potentiometer 170.

The thermistor 164 serves as the temperature sensor for both circuits. Since the thermistor 164 thus receives current flow from both thermostat legs of the comparator circuit, its sensitivity is adjusted to approximately half the sensitivity of the thermistors used in the devices of FIGS. 2 and 3, reflecting the increased current flow through this thermister.

The wiper arms 174 and 176 are mechanically linked to levers 178 and 180, respectively, by adjustment screw means whereby the angular relationship between the wiper arms and the levers can be fixedly adjusted in a factory calibration. These levers are pivoted at the wiper arm pivot of the potentiometers and are restrained in their pivotal movement by stops 182 and 184 which project from an interior wall of the housing. The levers can be adjusted in the manner previously described with regard to FIG. 3.

The invention has been described with reference to a presently preferred embodiment thereof. Obviously, the invention could be equally practiced in other embodiments, e.g., pneumatic control systems of similar operation could be substituted for the preferred and illustrated electronic system. Similarly, electronic components could be substituted, e.g., different temperature responsive elements such as PTC sensors, for example, PTC thermistors; thermocouples; or potentiometers with bimetallic driven wiper arms could be substituted for the preferred and illustrated thermistors.

It is, therefore, not intended that the invention be unduly limited by the description of the illustrated and presently preferred embodiments. Instead, it is intended that the invention be defined by the means and their obvious equivalents set forth in the following claims.

What is claimed is:

1. A thermostatic device for the generation of a plurality of command signals responsive to sensed temperature deviations of a control zone from upper and lower distinct set temperature points which comprise:
    temperature responsive means in a temperature sensing location in said control zone;
    first command signal generating means including said temperature responsive means and first circuit means to generate a first analog command signal in response to sensed temperature by said temperature responsive means about said upper set temperature point;
    second command signal generating means including said temperature responsive means and second circuit means to generate a second analog command signal in response to sensed temperature by said temperature responsive means about said lower set temperature point;
    first adjustment means in said first circuit means for the fixed adjustability of said upper set temperature point to values above a preselected minimal value;
    second adjustment means in said second circuit means for the fixed adjustability of said lower set temperature point to values below a preselected maximum value; and
    stop means associated with each of said first and second adjustment means to prevent movement of said adjustment means decreasing said upper set temperature point below said preselected minimal value and increasing said lower set temperature point above said preselected maximum value thereby providing a temperature separation band of from 3° to about 15°F. between said first and second analog signals.

2. The thermostatic device of claim 1 wherein said first adjustment means permits setting said upper set temperature point to values from 73° to 85° F. and said second adjustment means permits setting said lower set temperature point to values from 70° to 55° F.

3. The thermostatic device of claim 1 wherein said command signal generating means comprise first and second electrical circuits generating analog D.C. voltage command signals.

4. The thermostatic device of claim 3 wherein said temperature responsive means is a thermistor.

5. The thermostatic device of claim 3 wherein said temperature responsive means comprises first and second thermistors, each in said first and second command signal electrical circuits.

6. The thermostatic device of claim 5 including fixed resistance means connected across the terminals of each of said thermistors to impart substantially linear temperature responses thereto.

7. The thermostatic device of claim 5 wherein said first and second adjustment means comprise first and second variable resistance elements, one each in said first and second electrical circuits.

8. The thermostatic device of claim 7 with command signal conditioning means comprising:
    a constant direct current supply means;
    a pair of voltage comparator means;
    circuit means to each of said pair of voltage comparator means including; a signal generating leg in circuit with said constant direct current supply means and a separate one of said first and second electrical circuits of said thermostatic device, and a reference signal leg in circuit with said constant direct current supply means and resistance means of fixed value; and
    conductors connecting the reference and input signals terminals of said voltage comparator means to said reference and signal generating legs, respectively, of said circuit means.

9. The thermostatic device of claim 8 wherein each of said signal generating legs is in circuit with a remote temperature sensing circuit means.

10. The thermostatic device of claim 9 wherein said remote temperature sensing circuit means includes a remote thermistor having a temperature coefficient of lesser value than that of said first and second thermistors.

11. The thermostatic device of claim 8 wherein said voltage comparator means comprise a pair of operational amplifiers.

12. The thermostatic device of claim 11 including feedback circuit means from the output to the input signal terminals of each of said amplifiers.

13. The thermostatic device of claim 11 including amplifier means in circuit with the output of each of said operational amplifiers to develop an amplified voltage signal therefrom.

14. The thermostatic device of claim 13 wherein said amplifier means comprises amplifier transistor means having their base terminals in circuit with the output terminals of said operational amplifiers.

15. The thermostatic device of claim 14 having protective circuit means including protective transistor means in collector to base, and base to emitter connection to said amplifier transistor means and base biasing means thereto whereby said protective transistor means is a base voltage limiting means for said amplifier transistor means.

16. The thermostatic device of claim 8 wherein said constant direct current supply means comprises regulating transistor means having emitter and collector terminals in circuit with said legs and a base biasing circuit including a constant direct current voltage regulating means.

17. The thermostatic device of claim 16 wherein said voltage regulating means comprises a Zener diode in the emitter-base circuit of said regulating transistor means.

18. A thermostatic device for the generation of a plurality of command signals responsive to sensed temperature deviations of a control zone from upper and lower distinct set temperature points which comprise:

temperature responsive means in a temperature sensing location in said control zone;

first command signal generating means including said temperature responsive means and first circuit means to generate a first analog command signal in response to sensed temperature by said temperature responsive means about said upper set temperature point;

second command signal generating means including said temperature responsive means and second circuit means to generate a second analog command signal of discontinuous proportionation to said first command signal and offset therefrom by a band of from 3° to about 15° F. in response to sensed temperature by said temperature responsive means about said lower set temperature point;

adjustment means in said first and second circuit means for the fixed adjustability of said upper and lower set temperature points;

stop means associated with said adjustment means to prevent movement of said adjustment means decreasing the magnitude of said band.

19. The thermostatic device of claim 18, wherein said stop means prevents movement of said adjustment means decreasing said upper set point temperature below a preselected minimal value.

20. The thermostatic device of claim 18, wherein said stop means prevents movement of said adjustment means increasing said lower set point temperature above a preselected maximum value.

* * * * *